Oct. 21, 1924. 1,512,641
C. J. SCHOENING
AUTOMATIC SELF SETTING ANIMAL TRAP
Filed May 26, 1921
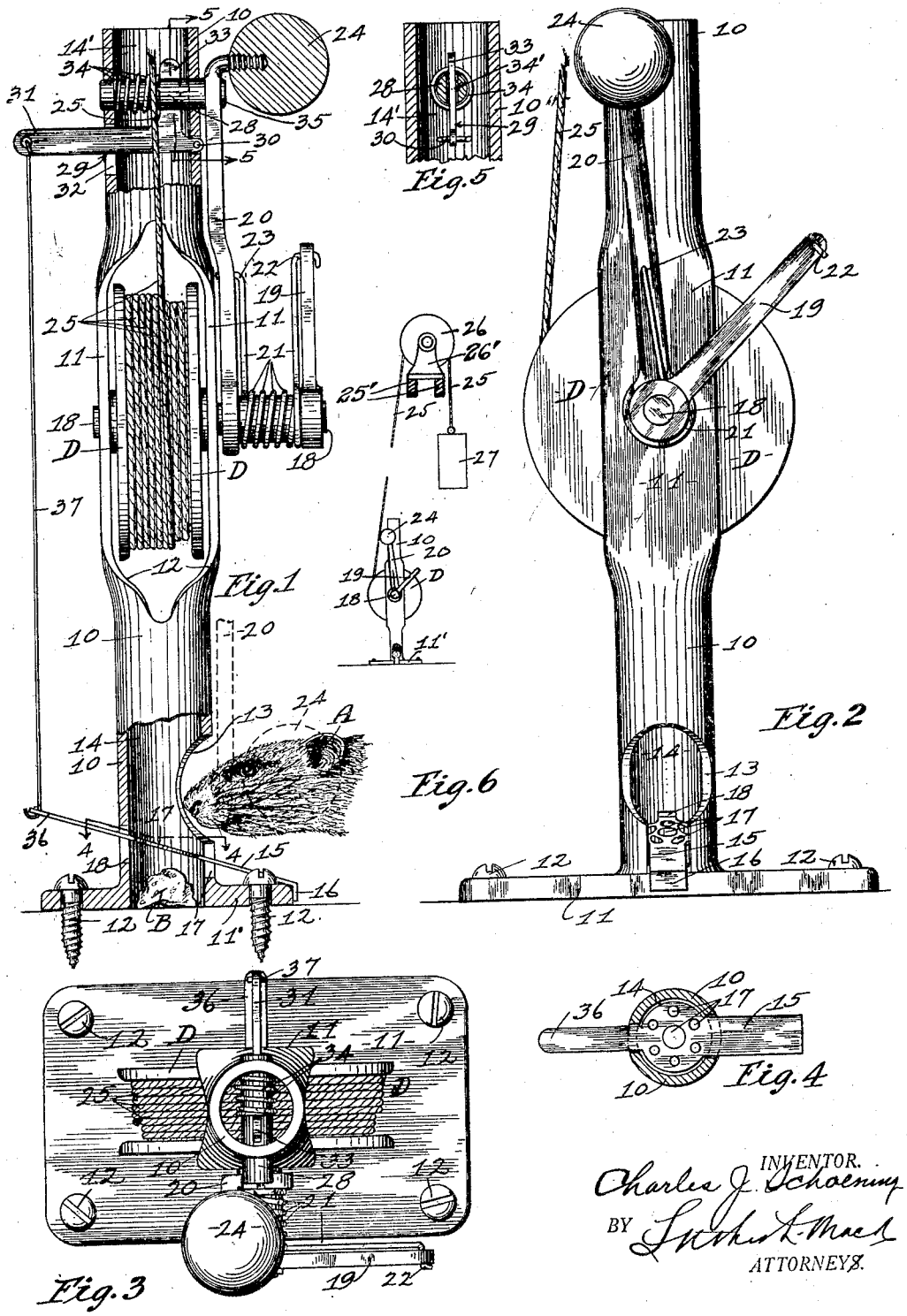

Patented Oct. 21, 1924.

1,512,641

UNITED STATES PATENT OFFICE.

CHARLES JULIUS SCHOENING, OF LOS ANGELES, CALIFORNIA.

AUTOMATIC SELF-SETTING ANIMAL TRAP.

Application filed May 26, 1921. Serial No. 472,807.

*To all whom it may concern:*

Be it known that I, CHARLES J. SCHOENING, a citizen of the United States, and a resident of Los Angeles, in the county of Los Angeles and State of California, have invented new and useful Improvements in Automatic Self-Setting Animal Traps, of which the following is a specification.

This invention relates to and has for a main object the provision of an automatic self setting animal trap, which can be manufactured with facility and with a minimum expense, and adapted to instantly kill an animal by crushing its skull and throwing the animal away from the trap thereafter.

A further object of the invention is to provide a trap of the character mentioned, in which one setting of the mechanism is sufficient for causing numerous successive operations of the mechanism without attention, and in which the bait can not be removed from the trap by the animal.

Other minor and detailed objects of the invention will appear as the description progresses.

I have illustrated one practical embodiment of my invention in the accompanying drawings, in which:

Fig. 1 is an elevation of my improved trap, partly in section.

Fig. 2 is an elevation of the same in a plane at right angles to Fig. 1.

Fig. 3 is a plan view of the same.

Fig. 4 is a section of the trap on line 4, 4, of Fig. 1.

Fig. 5 is a section of the same on line 5, 5, of Fig. 1.

Fig. 6 is a reduced elevation of the upper portion of the trap, showing a cable and weight connected thereto.

While I have shown and will now describe but one form of my invention, it will be understood that I may modify and change the structure and operation thereof within the scope of the appended claims without departing from the spirit of my invention.

The device as shown in said drawings, comprises a tubular standard 10 which is split at a point midway of its ends, and has flattened side portions 11, 11, formed thereon between which an opening 12 is provided, and said standard may be attached to or formed integrally with a horizontal base portion 11′ adapted to be supported on the ground or floor by means of said base, and held thereon by means of screws 12, 12, etc., which extend through suitable holes in the base, or nails may be used in lieu of said screws.

The lower portion of said standard, above the base 11′ has an aperture 13 formed therein of suitable size and form for permitting the entrance of an animal's head therethrough. The standard 10 has circular openings 14 and 14′ below and above the central openings 12, and a piece of bait B of suitable character is adapted to be deposited in the lower end of the opening 14, below a tripping plate or trip 15 which is supported at one end 16 on the edge of the base 11′ and extends through openings 17 and 18 on opposite sides of the standard 10.

The tripping plate 15 has a plurality of openings 17 on the interior of the standard 10, above the bait B, so that an animal A may be enabled to see and scent the bait B therethrough when the head of the animal is inserted in the opening 13 of the standard.

The central portion of the standard 10 is provided between the flat sides 11, thereof, with a drum D which is mounted on and fixed to a shaft 18 journaled in the portions 11, 11. One end of said shaft is extended substantially beyond the standard 10, and has a driving arm 19 adapted to be fixed to said shaft for rotation therewith. Another arm 20, which is substantially longer than the arm 19, is loosely mounted on the shaft 18, adjacent the side 11 of the standard, and intermediate said arms I provide a spring 21 which is coiled around the hub of the arm 19 and has one end 22 thereof attached to the arm 19 and its other end 23 attached to the arm 20. Said spring serves to resiliently connect the arms 19 and 20, and when the spring 21 is placed in tension by the adjustment of the arm 19, the spring serves to impart force to the arm 20.

The upper end of arm 20 carries a ball 24 of substantial size, and said ball may be suitably attached to the end of the arm 20, as shown, or otherwise, and is adapted to move in a path which will clear the side of the standard 10. A cable is attached at one end to the drum D and is wound for a plurality of turns, around said drum, and the outer end of said cable is adapted to be extended upwardly for a substantial distance and around a pulley 26, which may be suitably supported and carries a weight 27 thereon, as shown in Fig. 6.

Transversely mounted in the upper end of the standard 10 I provide a plunger 28 which is slidably held in oppositely formed apertures in the wall of the standard and is adapted to project substantially outwardly from one side thereof into the path of the arm 20, so as to prevent the movement of said arm and the ball 24 when the spring 21 is in tension. A tripping lever 29 is also mounted transversely in the upper portion of the standard 10, and is pivotally held on a pin 30 on one side of the standard.

The lever 29 has an arm 31 which extends substantially outwardly from the opposite side of the standard 10 through an opening 32, and a relatively right angular arm 33, integral therewith, extends upwardly through a slot 34' formed in the plunger 28, as shown in Figs. 1 and 5. A spring 34 is mounted on the plunger 28 and is adapted to compress between the inner side of the wall of the standard 10, and the arm 33 of said lever, so as to normally hold the end 35 of the plunger outwardly as an obstruction to the movement of the arm 20.

The outer end of arm 31 of the lever 29 is connected with the extended end 36 of the tripping plate 15 by means of a link 37, and it will be observed that when the animal trips the plate 15 by stepping thereon, or by touching the same in an attempt to get to the bait B, the plate 15 will be depressed and likewise the arm 31 of lever 29 will be correspondingly depressed and moved about its fulcrum pin 30, while the arm 33 of said lever will effect a retraction of the plunger 28 against the relatively light tension of the spring 34, so as to compress said spring and move the plunger inwardly and out of the path of the arm 20. Thus, when the plunger 28 is released the arm 20 will move forcibly around the shaft 18 and when an animal has its head approximately in the position shown in Fig. 1, the ball 24 of the arm 20 will strike the animal at the side of the head, and the blow will ordinarily serve to kill the animal and throw the same some distance away from the trap.

Now, in the meantime, when the arm 20 has passed the plunger 28, and the weight of the animal is removed from the plate 15, the tension of the spring 34 will restore the plunger 28 into the path of the arm 20, so as to stop the movement of said arm and the striking ball 24, and thus set the trap for a subsequent operation.

The cable 25 is wound by a plurality of turns around the drum D, and a weight 27 may be connected thereto, preferably held at a substantial distance above the ground or floor, so that a number of operations may be accomplished with one setting of the trap. Pulley 26 may be held on one or more brackets 26' attached to beams 25' of a barn or outbuilding, so that the weight will be at all times high enough to provide head room therebeneath, or said device may be attached to the limb of a tree or otherwise.

When, however, the weight 27 has descended to its lowest position, the trap may be reset by withdrawing the plunger, turning the drum, and thereby rewinding the cable 16 on said drum, until the weight has reached its highest position. It will also be observed that a uniform tension is maintained at all times by the provision of the weight 27, and that all operations of the trap will thereby produce a uniform result in the force of the blow, it being at all times the same.

What I claim is:

1. An animal trap comprising a standard, a rotatable drum transversely journaled in said standard, an arm movably mounted on said standard in axial alinement therewith and resiliently connected with said drum, the lower portion of said standard being adapted to receive and hold bait or the like, a trip mounted on said standard, means for forcibly rotating said drum for operating said arm, a detent device extended into the path of said arm for preventing the movement thereof, and means connecting said detent device with said trip for releasing said arm when said trip is sprung.

2. An animal trap comprising a standard, a rotatable drum transversely journaled in said standard, an arm movably mounted on said standard in axial alinement therewith and resiliently connected with said drum, the lower portion of said standard being adapted to receive and hold bait or the like, a trip mounted on said standard, means for forcibly rotating said drum for operating said arm, a detent device extended into the path of said arm for preventing the movement thereof, and means connecting said detent device with said trip for releasing said arm when said trip is sprung, said detent device including a spring held plunger normally held in the path of said arm, and adapted to be restored when said trap is restored.

3. An animal trap comprising a standard, a tripping plate on the base of said standard, a drum above said plate, a shaft fixed to the drum and journaled in said standard for rotatably supporting said drum, an arm fixed to said shaft, a striking arm loosely mounted on said shaft, a spring connecting said fixed and loose arms, a cable wound on said drum and having a weight on the end thereof for effecting the rotation of said drum, and said striking arm, and means connected with said tripping plate for releasing said striking arm when the trap is sprung, for the purpose described.

4. An animal trap comprising a supporting member, a tripping plate mounted at the base thereof, a drum transversely journaled thereon, a striking arm axially alined with said drum, a shaft for said drum and said arm, a spring on said shaft for resiliently connecting said drum and said arm, and means connected with said tripping plate for releasing said arm whereby the same is moved into contact with and for striking the head of an animal, as described.

5. An animal trap comprising a hollow standard, a transverse shaft journaled in said standard at a point substantially above the bottom thereof, a drum within said standard fixed to said shaft, a striking arm loosely mounted on said shaft externally of the standard, an arm fixed to said shaft and spaced from said striking arm, a spring carried on said shaft between and attached to said arms at its opposite ends for resiliently connecting the striking arm with the drum, means for holding said drum and said striking arm in tension, the transversely operable locking plunger normally engaging said striking arm, a tripping plate at the bottom of said standard and connected with said plunger whereby when said plunger is released said striking arm will be forcibly projected against the head of an animal attacking the bait in said trap.

6. An animal trap comprising a hollow standard, a transverse shaft journaled in said standard at a point substantially above the bottom thereof, a drum within said standard fixed to said shaft, a striking arm loosely mounted on said shaft externally of the standard, an arm fixed to said shaft and spaced from said striking arm, a spring carried on said shaft between and attached to said arms at its opposite ends for resiliently connecting the striking arm with the drum, means for holding said drum and said striking arm in tension, the transversely operable locking plunger normally engaging said striking arm, a tripping plate at the bottom of said standard and connected with said plunger, whereby when said plunger is released said striking arm will be forcibly projected against the head of an animal attacking the bait in said trap, and a spring on said plunger for projecting the plunger into the path of said striking arm when pressure on the tripping plate is released.

CHARLES J. SCHOENING.

Witnesses:
LUTHER L. MACK,
IRENE BREEN.